May 24, 1938.  H. KNOTT  2,118,731
ELECTRIC CORD TAKE-UP
Filed June 22, 1936
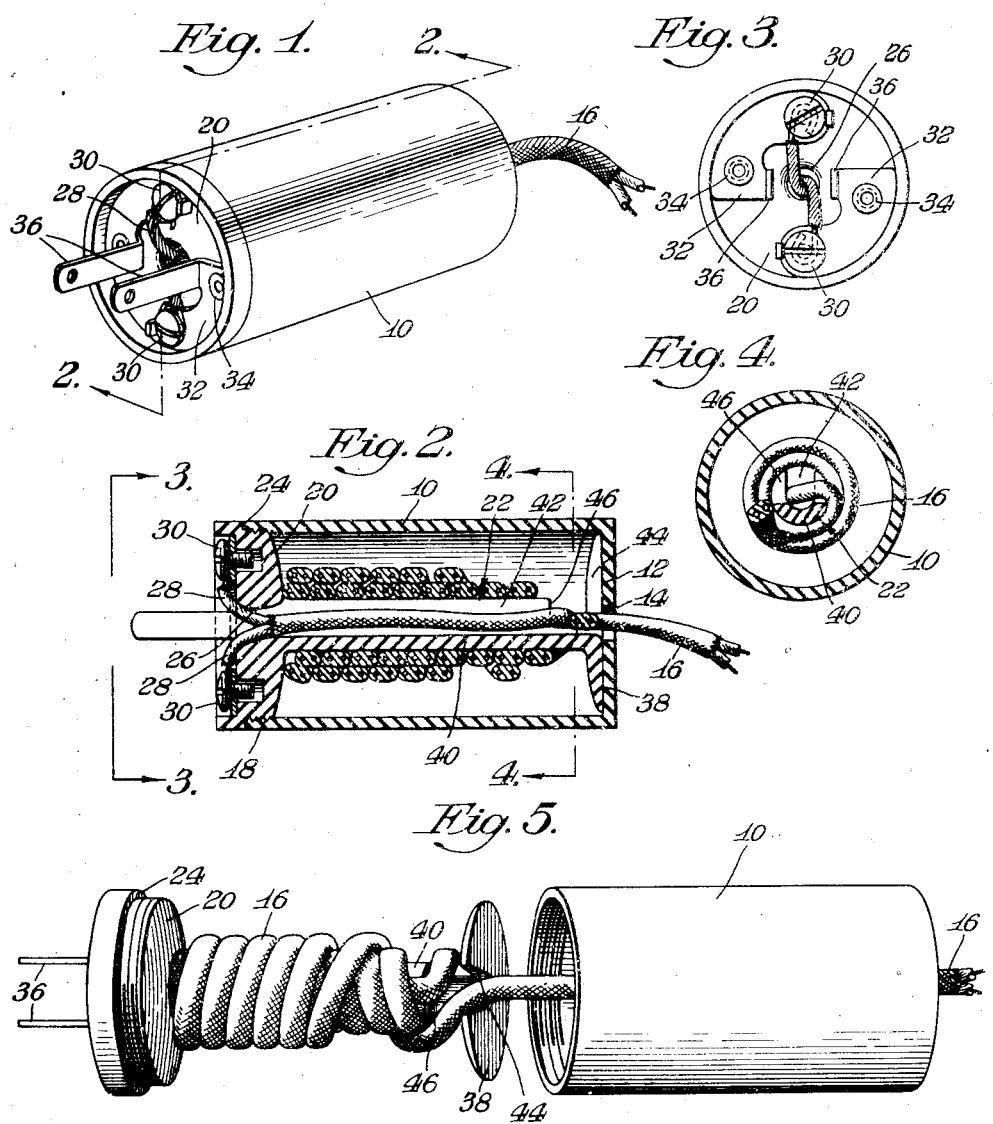
Helen Knott.
INVENTOR
BY Victor J. Evans & Co.
HER ATTORNEYS Patented May 24, 1938

2,118,731

UNITED STATES PATENT OFFICE 2,118,731

ELECTRIC CORD TAKE-UP

Helen Knott, Chicago, Ill.

Application June 22, 1936, Serial No. 86,662

2 Claims. (Cl. 173—361)

My invention relates to lamp cords and other electrical conductors, and has among its objects and advantages the provision of an improved device facilitating disposition of excess length.

In the accompanying drawing:

Fig. 1 is a perspective view of my invention;

Fig. 2 is a sectional view along the line 2—2 of Fig. 1;

Fig. 3 is an end view taken from the position indicated by line 3—3 of Fig. 2;

Fig. 4 is a sectional view along the line 4—4 of Fig. 2; and

Fig. 5 is a perspective view showing the principal parts in separated relation.

In the embodiment selected to illustrate my invention, I make use of a cylinder 10 having a closed end 12 provided with an opening 14 for the electric cord 16. The opposite end of the cylinder is provided with internal threads 18 having threaded relation with the flange 20 of the cord spool 22.

Flange 20 includes a flange 24 bearing against the open end of the cylinder 10, and is provided with a central opening 26 for the cord 16. This cord comprises the usual two wires 28 attached to screws 30 having threaded relation with metallic plates 32 mounted to the flange 20 by rivets 34 in the manner common to conventional electric wall plugs. Each plate 32 carries a prong 36 arranged to be inserted in the conventional wall outlet.

The second flange 38 of the spool 22 is integrally connected with the flange 20 through the medium of a reach 40 having a groove 42 for the reception of the cord 16. A recess 44 is provided in the flange 38 for accommodating the cord 16. In operation, the cord end adjacent the flange 20 is placed within the groove 42 and is bent laterally through the recess 46 and wound spirally about the reach 40 in the direction of the flange 20, and then in the reversed direction until the desired amount of cord has been wound upon the spool. After the desired amount of cord has been wound on the spool, the cylinder 10 is connected with the flange 20 at which time the cord wound upon the spool is effectively housed within the cylinder.

My invention is in the nature of an electric contact plug embodying means for housing excess cord. Floor lamps usually are provided with excess cord. By removing such excess, I prevent damage to the cord and remove the unsightly excess in addition to affording protection for the cord.

The spool and cylinder are made of insulating material, and the flange 38 abuts the end 12 of the cylinder 10 when the parts are assembled. The cylinder may be made of various lengths and diameters to accommodate various amounts of cord.

Without further elaboration, the foregoing will so fully explain my invention that others may, by applying current knowledge readily adapt the same for use under various conditions of service.

I claim:

1. A device of the type described comprising a spool having spaced flanges and an interconnecting reach, said reach being grooved and said groove passing through one of said flanges, electric contacts carried by the other of said flanges, an electric cord lying in said groove and wound upon said reach, one end of said electric cord being connected with said electric contacts, a tubular shell having a closed end provided with an opening, said tubular shell enclosing the said one flange and said interconnecting reach and detachably connected with the said other flange, the opening in said tubular shell being aligned with the groove extending through the said one flange and constituting an outlet for the other end of the cord.

2. A device of the type described comprising a spool having spaced flanges and an interconnecting reach provided with a longitudinal groove passing through one of said flanges, electric contacts attached to the other of said flanges and projecting outwardly therefrom, the said other of said flanges being provided with an opening communicating with one end of said groove, an electric cord lying in said groove and having one end passing through the opening in the other of said flanges and connected with said electric contacts, said cord being adapted to be wound on said interconnecting reach, a tubular shell having a closed end provided with an opening, said tubular shell having threaded connection with the said other flange and enclosing the said one flange and the interconnecting reach, the opening in said tubular shell being aligned with the groove extending through the said one flange and constituting an outlet for the other end of the cord, the closed end of the tubular shell lying adjacent the said one flange.

HELEN KNOTT.